A. HAMMER.
Brewer's Boiler.
No. 2,001. Reissued June 20, 1865.
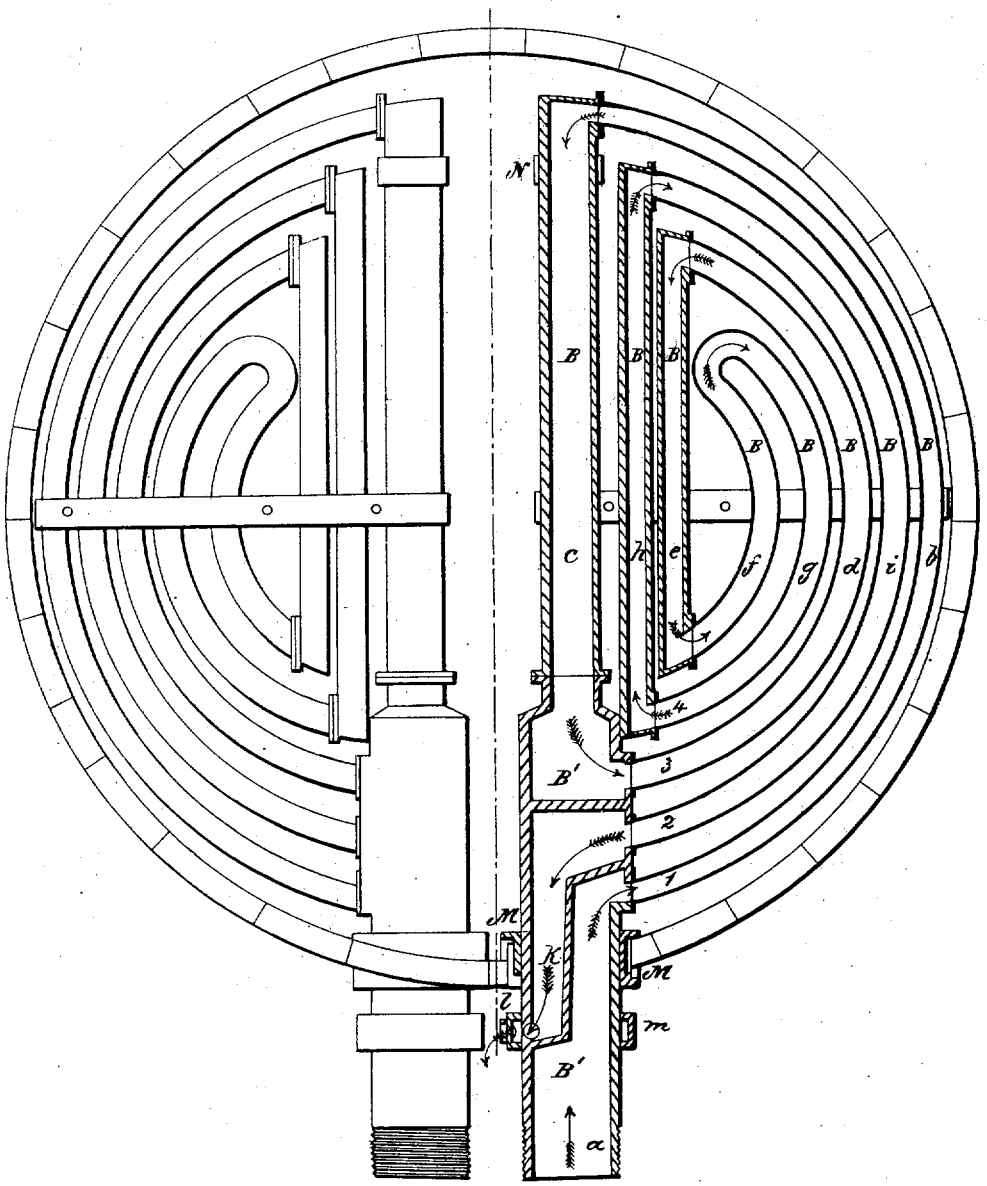
N. PETERS, Photo-Lithographer, Washington, D. C.

UNITED STATES PATENT OFFICE.

ADOLPH HAMMER, OF NEW YORK, N. Y.

IMPROVEMENT IN BREWERS' BOILERS.

Specification forming part of Letters Patent No. 17,968, dated August 11, 1857; Reissue No. 2,001, dated June 20, 1865.

*To all whom it may concern:*

Be it known that I, ADOLPH HAMMER, of the city, county, and State of New York, have invented a new and useful Improvement in Brewers' Boilers; and I do hereby declare that the following is a full, clear, and exact description thereof, which will enable those skilled in the art to make and use the same, reference being had to the accompanying drawings, forming part of this specification.

The drawing represents a plan or top view of this invention, partly in section.

The usual apparatus for boiling by steam consists of a coiled pipe placed horizontally in the tub, near its bottom, with the ends of said pipe extending through the sides of the tub or jointed thereto so as to allow of the coil being detached and hoisted out for cleaning, as occasion requires. This operation, which very frequently occurs in some of the arts, and more particularly in the art of brewing, requires such an arrangement of the boiling apparatus, whereby the time and labor consumed in, and the machinery requisite for, the hoisting and lowering of heavy coils, such as used by brewers, is saved, and furthermore the difficulty of remaking steam-tight joints is done away with.

Among the devices used or suggested I only know of Alfred Stillman's boiling apparatus, patented May 16, 1846, which is constructed on different principles than usual; but it does not answer the purpose generally, as it is only applicable to small and square tubs, which have to be constructed purposely and in combination with the boiling apparatus.

I have succeeded in constructing a boiling apparatus which answers the requirement in a most perfect manner by arranging the steam-pipes in boiling apparatus in two or more separate and distinct parts or sections, whereby either or all parts or sections may be elevated. For the sake of greater convenience I rotate said sections upon an axis of rotation at or near the center of the tub, and I also let in the steam and draw off the condensed water through the same pipe which forms the trunion, having partitions arranged in the manner hereinafter described.

A represents the tub, B the series of steam-pipes. The steam enters a partition-pipe, B′, at the point *a*, thence passes around through the pipe *b* to the compartment *c*, thence through pipe *d* and *e* to the pipe *f*, thence through the pipes *g*, *h*, and *i* to the rear chamber, *k*, of the main or entrance pipe B′, and finally it escapes through a small cock, *l*, all as indicated by the arrows. These portions of steam pipe are all made cylindrical in section and bolted together steam-tight, substantially as indicated in the drawing. The part which passes through the side of the tub works or rotates in a steam-tight bearing, M, while the inner end rests in or upon a bearing, N, which rises vertically from the bottom of the tub, so that the whole series may be readily turned up upon its edge, and thus admit of free access to the whole bottom of the vessel for the purpose of cleaning it. Furthermore, by these means the whole series of pipes can be brought in the most favorable position for cleaning without detaching them and hoisting them from the tub. The cock *l* is fixed in a hollow band, *m*, which, although fitted thereon steam-tight, is yet adjustable so as to bring the cock to any position required. It will be readily seen that this arrangement of steam-pipe entirely obviates the necessity of the detachment and hoisting hitherto required in brewers' boiling apparatus, and at the same time produces a better result, because a more uniform diffusion of the heat over the bottom of the vessel is effected.

It is obvious that the arrangement of pipes herein described may be employed with great advantage in connection with any boiling apparatus for sugar, salt, soap, distilleries, &c.

I disclaim the use of a series of branch pipes attached to a main pipe and made to rotate thereon in the manner described by Stillman in his patent of May 16, 1846.

I claim as new and desire to secure by Letters Patent—

1. Arranging the steam-pipe in boiling apparatus in two or more distinct and separate parts or series, each of which can be turned up or rotated, substantially as and for the purpose set forth.

2. Rotating the parts or sections of a steam-pipe in a boiling aparatus upon an axis at or near the center of the tub, substantially as and for the purpose specified.

A. HAMMER.

Witnesses:

W. HAUFF,

E. I. COOPER.